(12) United States Patent
Diamond et al.

(10) Patent No.: US 11,975,614 B2
(45) Date of Patent: May 7, 2024

(54) VEHICLE-TO-VEHICLE TOWING COMMUNICATION LINK

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Andrew Denis Lewandowski, Sterling Heights, MI (US); Jordan Barrett, Milford, MI (US); Michael Alan McNees, Flat Rock, MI (US); Lars Niklas Pettersson, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 109 days.

(21) Appl. No.: 17/399,804

(22) Filed: Aug. 11, 2021

(65) Prior Publication Data
US 2023/0050842 A1 Feb. 16, 2023

(51) Int. Cl.
| | |
|---|---|
| *B60L 15/20* | (2006.01) |
| *B60W 30/18* | (2012.01) |
| *B60W 50/14* | (2020.01) |
| *G01C 21/34* | (2006.01) |
| *G07C 5/08* | (2006.01) |
| *H04W 4/46* | (2018.01) |

(52) U.S. Cl.
CPC ....... *B60L 15/20* (2013.01); *B60W 30/18009* (2013.01); *B60W 50/14* (2013.01); *G07C 5/0825* (2013.01); *H04W 4/46* (2018.02); *B60W 2050/146* (2013.01); *B60W 2530/203* (2020.02); *B60W 2556/65* (2020.02); *G01C 21/3407* (2013.01)

(58) Field of Classification Search
CPC . B60L 15/20; B60W 30/18009; B60W 50/14; B60W 2050/146; B60W 2530/203; B60W 2556/65; G07C 5/0825; H04W 4/46; G01C 21/3407
See application file for complete search history.

(56) References Cited

U.S. PATENT DOCUMENTS

| | | | |
|---|---|---|---|
| 6,866,350 B2 | 3/2005 | Palmer et al. | |
| 7,712,760 B2 | 5/2010 | Ohtomo | |
| 8,005,589 B2 * | 8/2011 | MacDonald | G01M 17/007 701/31.4 |
| 9,335,163 B2 * | 5/2016 | Lavoie | B60D 1/245 |
| 9,403,413 B2 | 8/2016 | Talty et al. | |
| 9,738,125 B1 * | 8/2017 | Brickley | B60D 1/62 |
| 9,854,209 B2 * | 12/2017 | Aich | B60W 10/18 |
| 10,076,937 B2 | 9/2018 | Dudar et al. | |
| 2009/0319121 A1 * | 12/2009 | MacDonald | G01M 17/007 701/31.4 |
| 2016/0245659 A1 * | 8/2016 | Ohba | B62D 13/06 |

(Continued)

*Primary Examiner* — Peter D Nolan
*Assistant Examiner* — Tanya C Sienko
(74) *Attorney, Agent, or Firm* — Joseph Zane; Brooks Kushman P.C.

(57) ABSTRACT

Informed towing is provided. Towing information is identified, by a towing vehicle, with respect to a towed vehicle to be towed by the towing vehicle. A towed configuration of the towed vehicle is monitored. Responsive to the towed configuration of the towed vehicle being incorrect according to the towing information, a warning is displayed in the HMI indicating the incorrect towing configuration.

23 Claims, 6 Drawing Sheets

(56) References Cited

U.S. PATENT DOCUMENTS

| | | | |
|---|---|---|---|
| 2018/0039266 A1* | 2/2018 | Dotzler | G01C 21/3415 |
| 2018/0113476 A1* | 4/2018 | Giles | G05D 1/0295 |
| 2019/0009815 A1* | 1/2019 | Lavoie | B62D 13/06 |
| 2019/0033150 A1* | 1/2019 | Lassche | G01L 1/10 |
| 2019/0210418 A1 | 7/2019 | Hall et al. | |
| 2019/0233034 A1 | 8/2019 | Viele et al. | |
| 2020/0010018 A1* | 1/2020 | Maruoka | B62D 13/025 |
| 2021/0370912 A1* | 12/2021 | Yamamoto | B60W 30/02 |

\* cited by examiner

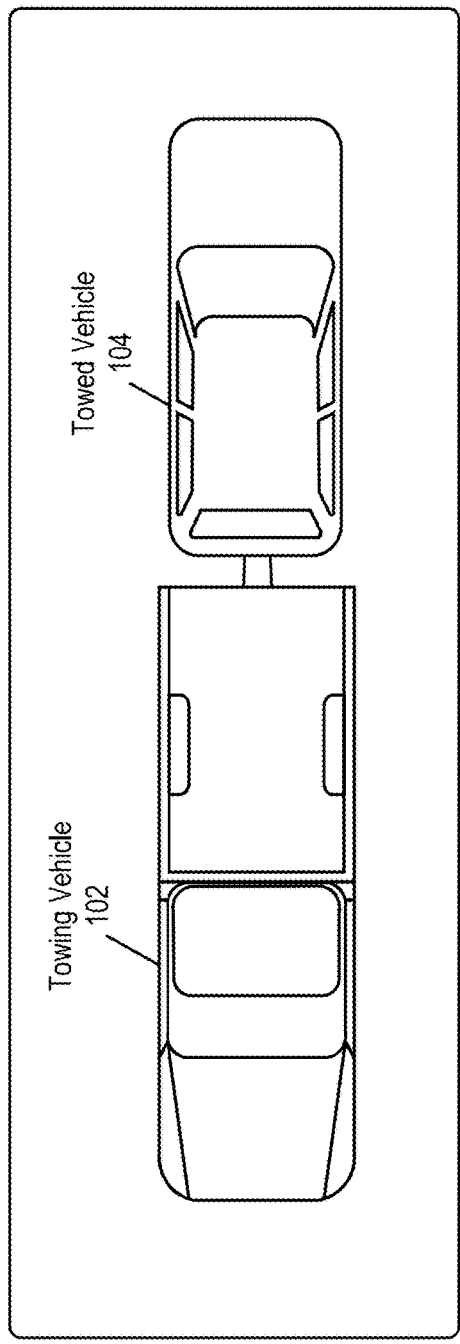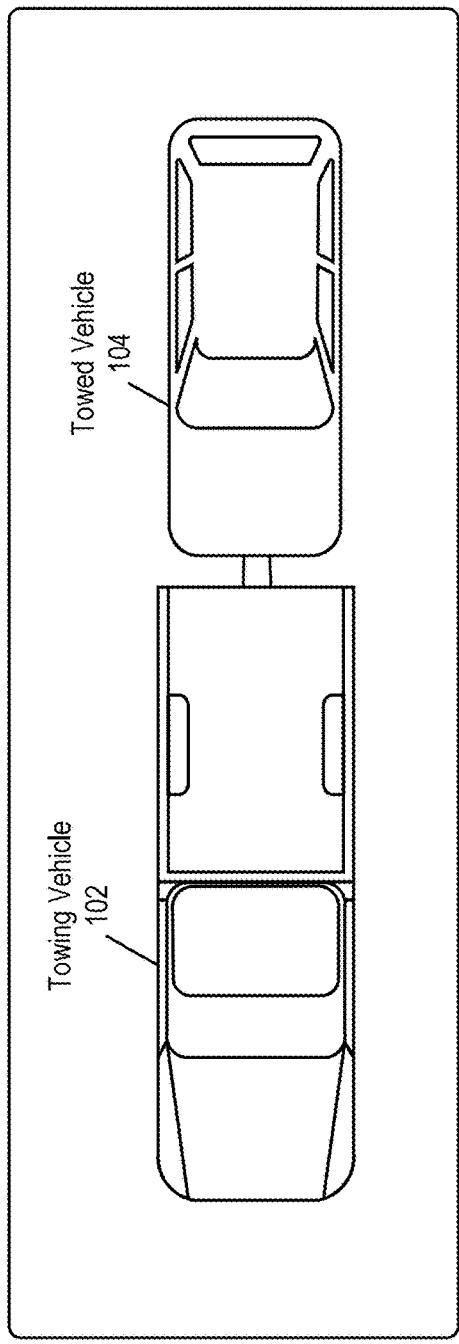

VEHICLE-TO-VEHICLE TOWING COMMUNICATION LINK

TECHNICAL FIELD

Aspects of the disclosure generally relate to a vehicle-to-vehicle (V2V) communication link that may be established for towing to avoid undesirable side effects to the powertrain of electrified or other types of vehicle.

BACKGROUND

V2V communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote control services, such as over the air (OTA) software download, eCall, and turn-by-turn navigation.

SUMMARY

In one or more illustrative embodiments, a towing vehicle for informed towing is provided. The vehicle includes a transceiver, a human-machine interface (HMI), and a processor. The processor is programmed to identify towing information with respect to a towed vehicle to be towed by the towing vehicle, monitor a towed configuration of the towed vehicle, and responsive to the towed configuration of the towed vehicle being incorrect according to the towing information, display a warning in the HMI indicating the incorrect towing configuration.

In one or more illustrative embodiments, a method for informed towing is provided. Towing information is identified, by a towing vehicle, with respect to a towed vehicle to be towed by the towing vehicle. A towed configuration of the towed vehicle is monitored. Responsive to the towed configuration of the towed vehicle being incorrect according to the towing information, a warning is displayed in the HMI indicating the incorrect towing configuration.

In one or more illustrative embodiments, a non-transitory computer-readable medium comprising instructions that, when executed by a processor of a towing vehicle, cause the towing vehicle to perform operations including to identify, by a towing vehicle, towing information with respect to a towed vehicle to be towed by the towing vehicle; monitor a towed configuration of the towed vehicle; and responsive to the towed configuration of the towed vehicle being incorrect according to the towing information, display a warning in the HMI indicating the incorrect towing configuration.

BRIEF DESCRIPTION OF THE DRAWINGS

FIG. 3 illustrates an example user interface showing a first tow orientation of the towed vehicle with respect to the towing vehicle;

FIG. 4 illustrates an example user interface showing a second tow orientation of the towed vehicle with respect to the towing vehicle;

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
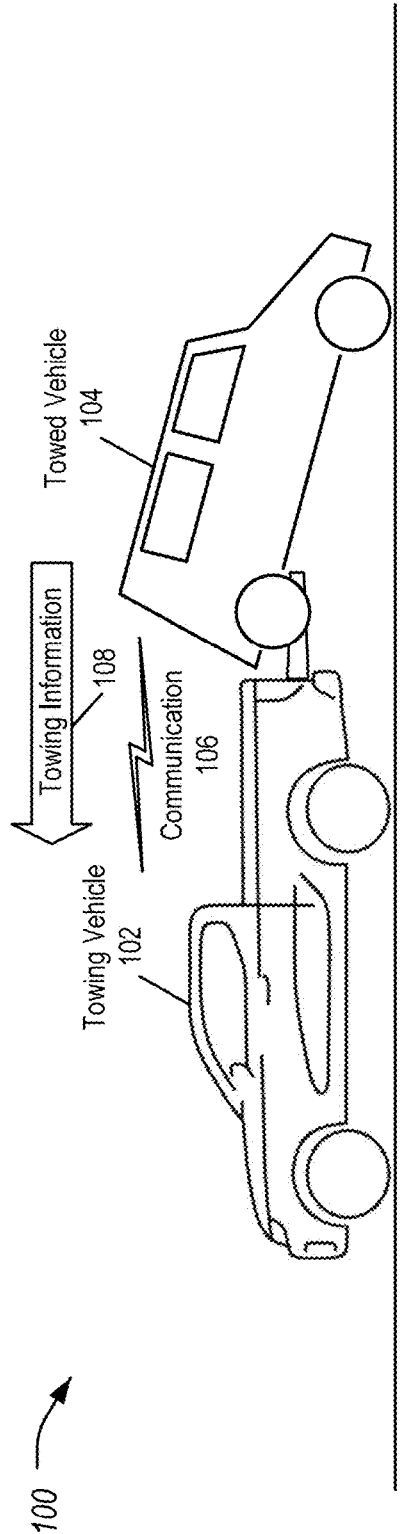
FIG. 1 illustrates an example of a towing vehicle that is towing a towed vehicle.

FIG. 1 illustrates an example of a towing vehicle 102 that is towing a towed vehicle 104. A towing vehicle 102 may include various types of automobile, crossover utility vehicle (CUV), sport utility vehicle (SUV), truck, recreational vehicle, boat, plane or other mobile machine for transporting people or goods. In some cases, the towing vehicle 102 may be powered by an internal combustion engine. In other cases, the towing vehicle 102 may be a battery electric vehicle powered by one or more electric motors. As a further possibility, the towing vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. The towing vehicle 102 may be a vehicle driven by a driver with driver assistance features. In other examples, the vehicle may be a semi-autonomous vehicle (AV). These AV or driver assistance features may be supported via received V2X data. The level of automation may vary between variant levels of driver assistance technology to a fully automatic, driverless vehicle. As the type and configuration of towing vehicle 102 may vary, the capabilities of the towing vehicle 102 may correspondingly vary. As some other possibilities, towing vehicles 102 may have different capabilities with respect to passenger capacity, towing ability and capacity, and storage volume.

The towed vehicle 104 may have any of the same aspects as the towing vehicle 102. However, instead of operating under its own power, the towed vehicle 104 may instead be transported by the towing vehicle 102. Such towing of towed vehicles 104 is a common occurrence. As some examples, towing vehicles 102 may be performed due to the towed vehicle 104 needing repair (e.g., a flat tire, an overheating condition, etc.), or due to the towed vehicle 104 being parked in a no parking location. With many internal combustion powertrain vehicles, towing may be performed by putting the towed vehicle 104 in neutral (if not on a rollback/flatbed) and allowing the vehicle's wheels to rotate at the speed of the towing vehicle 102. However, with electric towed vehicles 104, towing in such a configuration may result in undesirable side effects to the vehicle powertrain.

Communication 106 between the towing vehicle 102 and towed vehicle 104 may be performed to ensure the correct method is used to transport the towed vehicle 104. The communication 106 may be performed over various protocols, such as DSRC, BLUETOOTH, Wi-Fi, auditory communication, e.g., via a signal modulated to a horn of the towed vehicle 104 communicating information to a microphone of the towing vehicle 102, via a signal modulated to headlights or taillights of the towed vehicle 104 to be picked up by a camera or other light sensor of the towing vehicle 102, etc.

Regardless of the protocol or medium, towing information 108 may be sent from the towed vehicle 104 to the towing vehicle 102. The towing information 108 provides information with respect to how the towing vehicle 102 should tow the towed vehicle 104. For example, the towing information 108 may specify towing criteria descriptive of appropriate settings for towing the towed vehicle 104 for one or more tow methods. The settings may include for example, top speed for towing the towed vehicle 104, maximum distance to tow the towed vehicle 104, maximum angle to attach the towed vehicle 104 to the towing vehicle 102, allowable driving maneuvers, maximum amount of time to tow the towed vehicle 104 between key on cycles of the towed vehicle 104, etc. The settings may be defined to prevent the towing vehicle 102 from exceeding the design specifications of the towed vehicle 104. The tow methods may indicate aspects of possible tow configurations for towing the towed vehicle 104. These tow methods may include, for example, flatbed, boom, sling, dolly, etc., as well as orientation of the towed vehicle 104 (forwards, backwards).

The communication 106 may provide the towing information 108 to allow the towing vehicle 102 to control and/or limit the towing vehicle 102 to driving maneuvers and orientation to ensure undesired side effects do not occur to the towed vehicle 104. For instance, the towing vehicle 102 may perform route planning from a start location to a destination location to ensure the top speed and/or distance travelled does not violate the towing criteria. The towing vehicle 102 may also perform orientation validation of the towed vehicle 104 to ensure correct tow method is utilized. The towing vehicle 102 may also receive information from towed vehicle 104, such as specifications, instructions, or sensor outputs such as cameras, accelerometer data, Radar, LiDAR, etc., to ensure that the towing is performed correctly.

Figure 2:
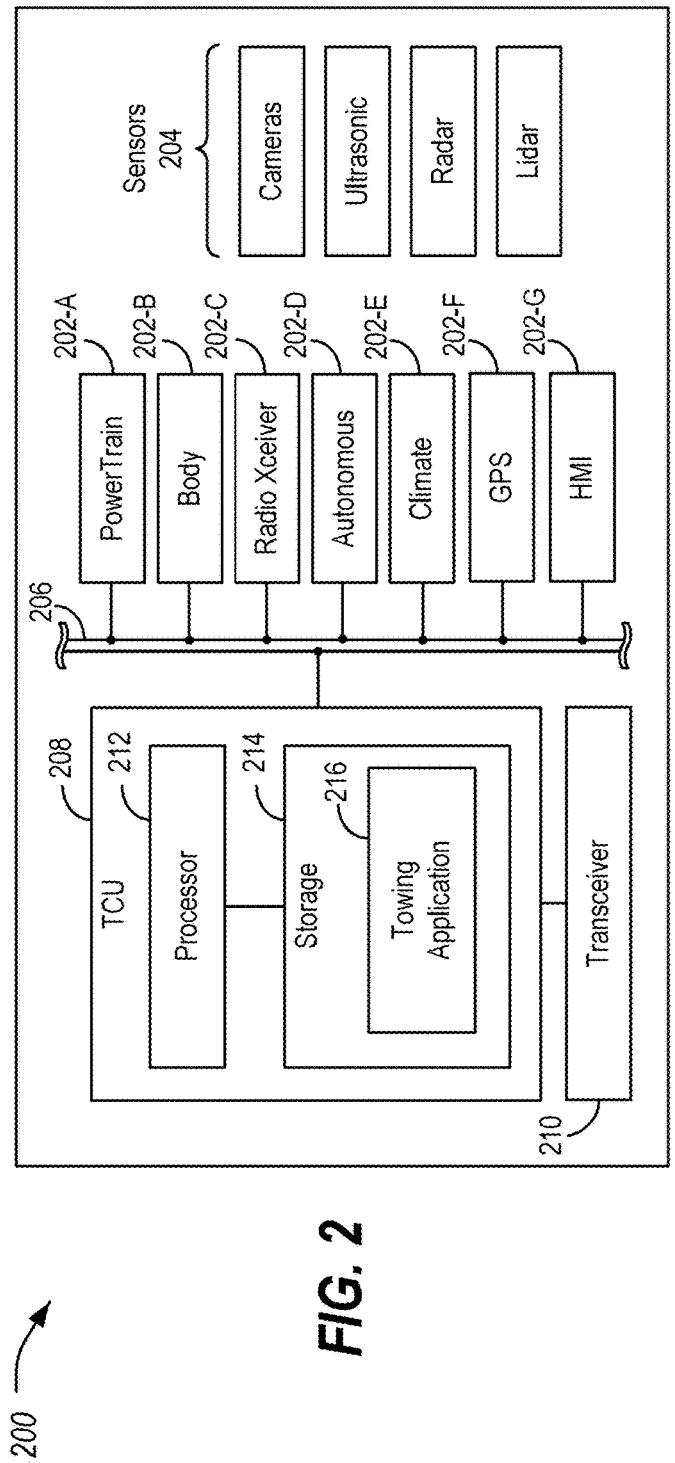
FIG. 2 illustrates an example of vehicle details including aspects of the towing vehicle and/or the towed vehicle.

FIG. 2 illustrates an example of vehicle details 200 including aspects of the towing vehicle 102 and/or the towed vehicle 104. The vehicle details 200 may include a plurality of controllers 202 configured to perform and manage various functions under the power of a vehicle battery and/or drivetrain. As depicted, the example vehicle controllers 202 are represented as discrete controllers 202 (i.e., controllers 202-A through 202-G). However, the vehicle controllers 202 may share physical hardware, firmware, and/or software, such that the functionality from multiple controllers 202 may be integrated into a single controller 202, and that the functionality of various such controllers 202 may be distributed across a plurality of controllers 202.

As some non-limiting vehicle controller 202 examples: a powertrain controller 202-A may be configured to provide control of engine operating components (e.g., idle control components, fuel delivery components, emissions control components, etc.) and for monitoring status of such engine operating components (e.g., status of engine codes); a body controller 202-B may be configured to manage various power control functions such as exterior lighting, interior lighting, keyless entry, remote start, and point of access status verification (e.g., closure status of the hood, doors and/or trunk of the towing vehicle 102); a radio transceiver controller 202-C may be configured to communicate with key fobs, mobile devices, towing vehicles 102, towed vehicles 104, and the like; an autonomous controller 202-D may be configured to provide commands to control the powertrain, steering, or other aspects; a climate control management controller 202-E may be configured to provide control of heating and cooling system components (e.g., compressor clutch, blower fan, temperature sensors, etc.); a global positioning system (GPS) controller 202-F may be configured to provide vehicle location information; and a HMI controller 202-G may be configured to receive user input via various buttons or other controls, as well as provide vehicle status information to a driver, such as fuel level information, engine operating temperature information, and current location of the towing vehicle 102.

The controllers 202 may make use of various sensors 204 in order to receive information with respect to the surroundings of the towing vehicle 102. In an example, these sensors 204 may include one or more of cameras (e.g., ADAS cameras), ultrasonic sensors, radar systems, and/or lidar systems.

A vehicle bus 206 may include various methods of communication available between the vehicle controllers 202, as well as between a telematics control unit (TCU) 208 and the vehicle controllers 202. As some non-limiting examples, the vehicle bus 206 may include one or more of a vehicle controller area network (CAN), an Ethernet network, and a media-oriented system transfer (MOST) network. Further aspects of the layout and number of vehicle buses 206 are discussed in further detail below.

The TCU 208 may include network hardware configured to facilitate communication between the vehicle controllers 202 and with other devices of the system 100. For example, the TCU 208 may include or otherwise access a cellular transceiver 210 configured to facilitate communication with other towing vehicles 102, with towed vehicles 104, or with infrastructure. The TCU 208 may, accordingly, be configured to communicate over various protocols, such as with a communication network over a network protocol (such as Uu). The TCU 208 may, additionally, be configured to communicate over a broadcast peer-to-peer protocol (such as PC5), to facilitate cellular vehicle-to-everything (C-V2X) communications with devices such as other towing vehicles 102. It should be noted that these protocols are merely examples, and different peer-to-peer and/or cellular technologies may be used.

The TCU 208 may include various types of computing apparatus in support of performance of the functions of the TCU 208 described herein. In an example, the TCU 208 may include one or more processors 212 configured to execute computer instructions, and a storage 214 medium on which the computer-executable instructions and/or data may be maintained. A computer-readable storage medium (also referred to as a processor-readable medium or storage 214) includes any non-transitory (e.g., tangible) medium that participates in providing data (e.g., instructions) that may be read by a computer (e.g., by the processor(s)). In general, the processor 212 receives instructions and/or data, e.g., from the storage 214, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc. In an example, the management of the towing operations discussed herein may be handled by a towing application 216 executed by the TCU 208.

The towing application 216 may be configured to manage the communication 106 between the towing vehicle 102 and towed vehicle 104 to ensure the correct method is used to transport the towed vehicle 104. In an example, towing information 108 may be sent from the towed vehicle 104 to the towing vehicle 102 using the towing application 216, where the towing information 108 provides information with respect to how the towing vehicle 102 should tow the towed vehicle 104. This communication 106 may provide the towing information 108 to allow the towing vehicle 102 to control and/or limit the towing vehicle 102 to driving maneuvers and orientation to ensure undesired side effects do not occur to the towed vehicle 104.

The towing information 108 may be wirelessly received from the towed vehicle 104. In another example, the towing vehicle 102 may utilize optical recognition of the towed vehicle 104, license plate number reading of the towed vehicle 104, and/or VIN scanning of the towed vehicle 104 to determine vehicle specifications. In yet another example, the towing vehicle 102 may query a roadside unit for the towing information 108 for the towed vehicle 104, e.g., according to VIN or other information captured from the towed vehicle 104.

As noted earlier, the towing information 108 may include information such as methods of towed transportation (e.g., flatbed, boom, sling, dolly, etc.), towed vehicle 104 powertrain type (e.g., electric, hybrid, vs internal combustion engine), electric motor type of the towed vehicle 104 (e.g., as there may be different tow considerations for interior permanent magnet electric motor drivetrains vs induction motor drivetrains), an owner's manual of the towed vehicle 104, model year of the towed vehicle 104, model of the towed vehicle 104, how to activate a tow mode of the towed vehicle 104, a maximum top speed for towing of the towed vehicle 104, a maximum towing distance of the towed vehicle 104, a maximum time for the towed vehicle 104 to be towed between key on cycles of the towed vehicle 104, etc.

The towing application 216 may be configured to utilize tow method recognition and orientation validation to identify how the towing vehicle 102 is towing the towed vehicle 104. In an example, the towing vehicle 102 may utilize cameras or other external hardware on the towing vehicle 102, towed vehicle 104, or a mobile device of the user of the towing vehicle 102 to check the orientation of the towed vehicle 104 to ensure it matches a vehicle orientation specified by the towing information 108 as applicable for the towed vehicle 104 before the towing vehicle 102 may enter motive mode (e.g., drive, reverse) to tow the towed vehicle 104.

Validation of the tow orientation may be performed by the towing application 216 through image and object recognition. In an example, the orientation detection may use cameras, radar, and/or ultrasonic sensors of the towing vehicle 102 and/or towed vehicle 104. For instance, the towing application 216 may use a back-up camera and/or ultrasonic sensors of the towing vehicle 102 to determine if there is a towed vehicle 104 behind the towing vehicle 102. Additionally or alternately, the towing application 216 may determine whether a grill or rear bumper of the towed vehicle 104 is closest to the towing vehicle 102 using cameras and image recognition algorithms. In a further example, the towing application 216 may use information received via the communication 106 from a longitudinal sensor of the towed vehicle 104 to determine levelness of the towed vehicle 104 and/or an angle of the towed vehicle 104. If the tow orientation is incorrect, the towing application 216 may provide instructions regarding what is incorrect and/or how to correct the incorrect tow orientation.

The towing application 216 may be configured to visualize the towing information 108 on the HMI 202-G of the towing vehicle 102. This may allow the tow operator to view and understand the correct approach to towing the towed vehicle 104. Examples of such user interfaces are shown in FIGS. 3-7.

FIG. 3 illustrates an example user interface 300 showing a first tow orientation of the towed vehicle 104 with respect to the towing vehicle 102. In an example, the user interface 300 may be displayed to the HMI 202-G of the towing vehicle 102 based on the towing information 108 identified by the towing vehicle 102. As shown, the towing information 108 indicates that the towing vehicle 102 should be oriented facing rearward, with the rear wheels attached to the hitch and the front wheels free on the ground.

FIG. 4 illustrates an example user interface 400 showing a second tow orientation of the towed vehicle 104 with respect to the towing vehicle 102. As with the user interface 300, the user interface 400 may be displayed to the HMI 202-G of the towing vehicle 102 based on the towing information 108 identified by the towing vehicle 102. Here, as opposed to the user interface 300, the towing information 108 indicates that the towing vehicle 102 should be oriented facing forwards, with the front wheels attached to the hitch and the rear wheels free on the ground.

Figure 5:
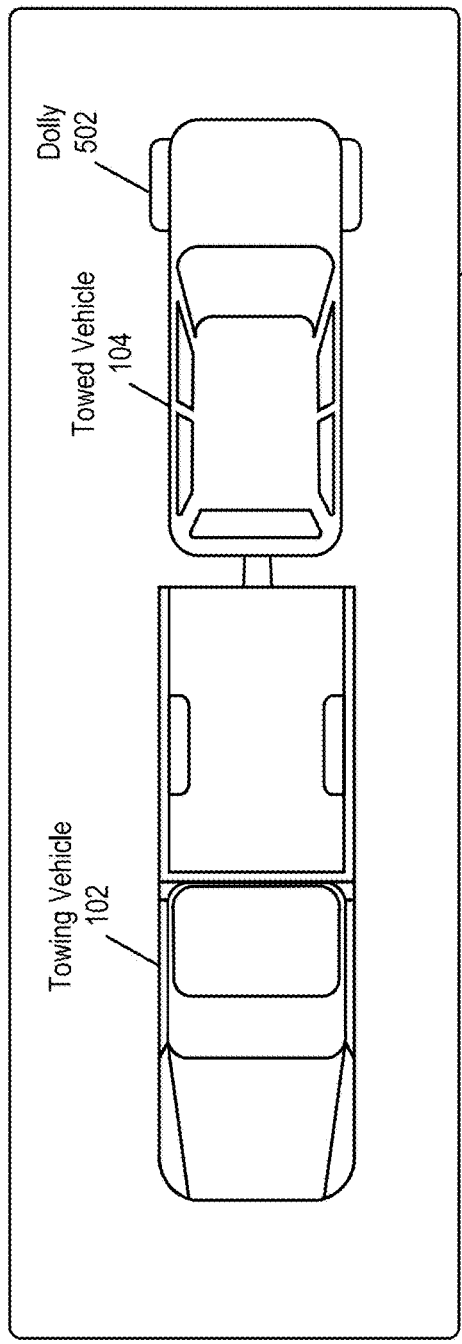
FIG. 5 illustrates an example user interface showing a tow configuration of the towed vehicle including a required method of towed transportation.

FIG. 5 illustrates an example user interface 500 showing a tow configuration of the towed vehicle 104 including a required method of towed transportation. As with the user interfaces 300 and 400, the user interface 500 may be displayed to the HMI 202-G of the towing vehicle 102 based on the towing information 108 identified by the towing vehicle 102. As shown, the towing information 108 indicates that the towing vehicle 102 should be oriented facing rearward, with the rear wheels attached to the hitch and the front wheels on a dolly 502.

Figure 6:
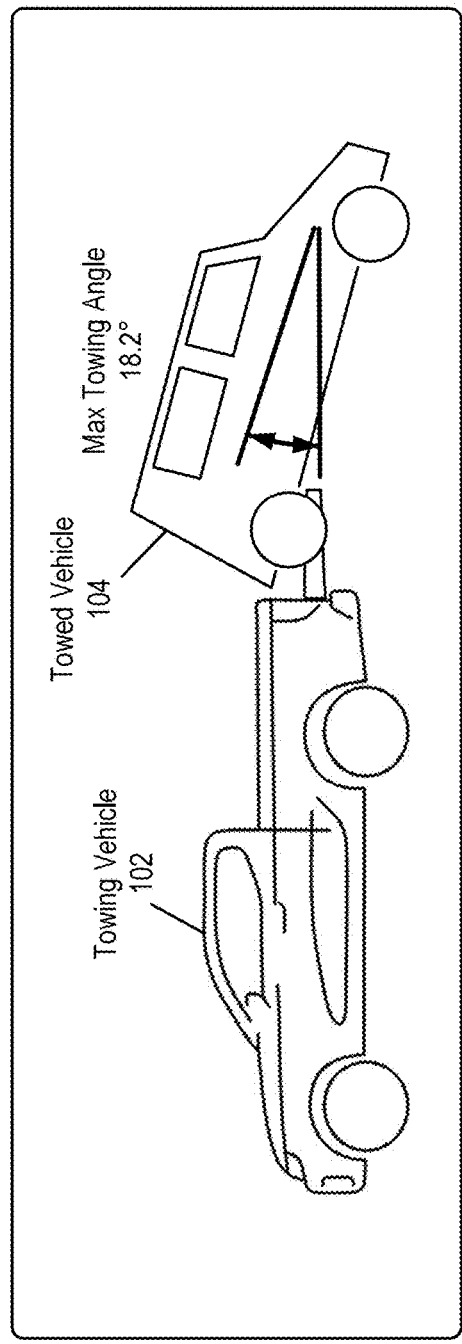
FIG. 6 illustrates an example user interface showing a tow configuration of the towed vehicle including a required angle of towed transportation.

FIG. 6 illustrates an example user interface 600 showing a tow configuration of the towed vehicle 104 including a required angle of towed transportation. As with the user interfaces 300, 400, and 500, the user interface 600 may be displayed to the HMI 202-G of the towing vehicle 102 based on the towing information 108 identified by the towing vehicle 102. Here, the user interface 600 shows a maximum tow angle of the towed vehicle 104.

Figure 7:
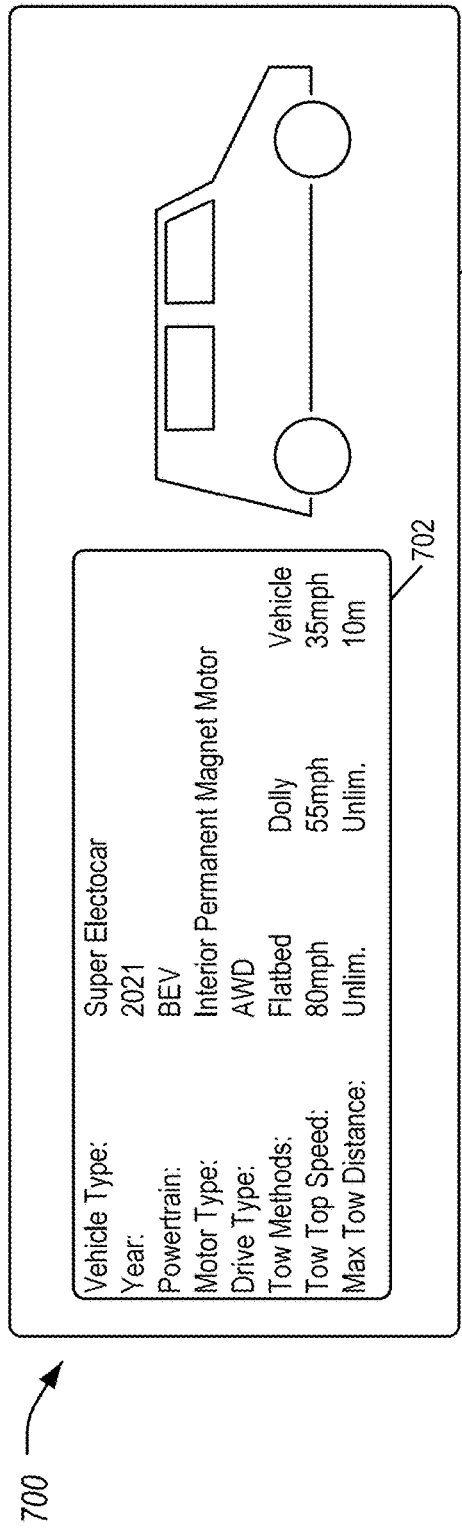
FIG. 7 illustrates an example user interface showing detailed towing information for the towed vehicle.

FIG. 7 illustrates an example user interface 700 showing detailed towing information 108 for the towed vehicle 104. As with the user interfaces 300-600, the user interface 700 may be displayed to the HMI 202-G of the towing vehicle 102 based on the towing information 108 identified by the towing vehicle 102. Here, the user interface 700 provides detailed textual information 402 based on the towing information 108. This may include for example, the make, model, and type, the year of production, the type of powertrain, the motor type (e.g., if an EV), the drive wheel configuration, and maximum tow speed and tow distance for various types of tow methods.

Figure 8:
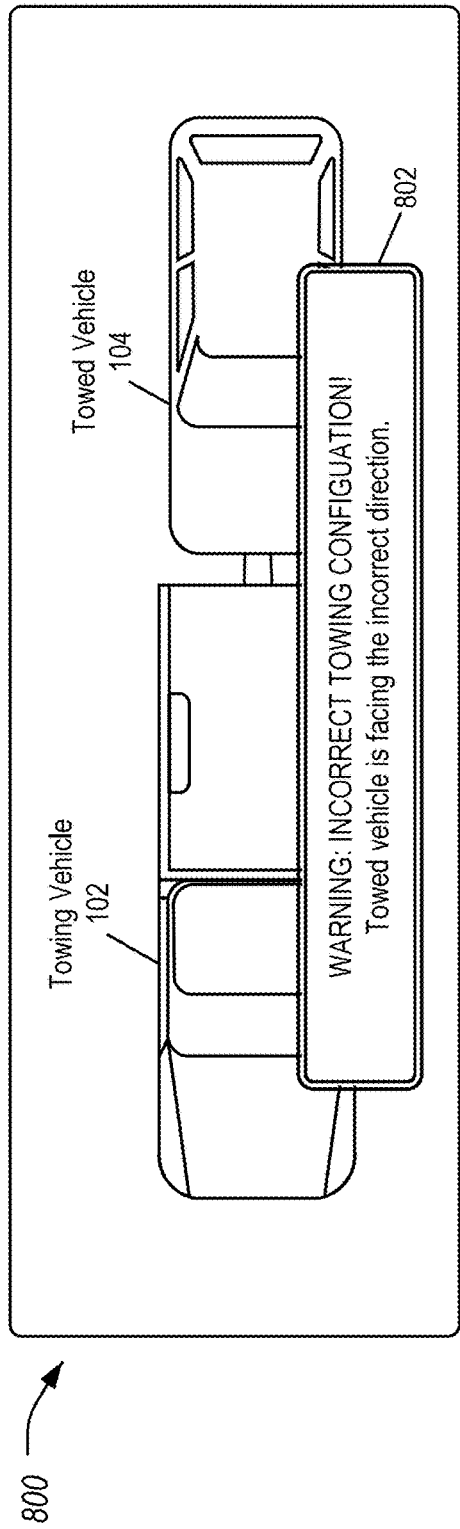
FIG. 8 illustrates an example user interface showing a warning message with respect to the tow configuration of the towed vehicle.

FIG. 8 illustrates an example user interface 800 showing a warning message 802 with respect to the tow configuration of the towed vehicle 104. As with the user interfaces 300-700, the user interface 800 may be displayed to the HMI 202-G of the towing vehicle 102 based on the towing information 108 received to the towing vehicle 102 from the towed vehicle 104. Here, the user interface 800 shows a warning message 802 indicating an issue with the towing configuration, based on the towing information 108 and an identification of the current orientation of the towed vehicle 104 with respect to the towing vehicle 102. By reviewing the warning message 802, the tow operator may be informed any potential issue. This may allow the tow operator to correct the issue, thereby avoiding undesirable side effects to the powertrain of electrified vehicles.

Variations on the warning message 802 approach are possible. For instance, if the tow hook up process is automated and the towed vehicle 104 orientation is non-ideal, the towing vehicle 102 may be configured to utilize autonomous features to reorient the orientation of the towed vehicle 104 through an automated hook up process, instead of or in addition to providing a warning to the driver of the tow vehicle.

Figure 9:
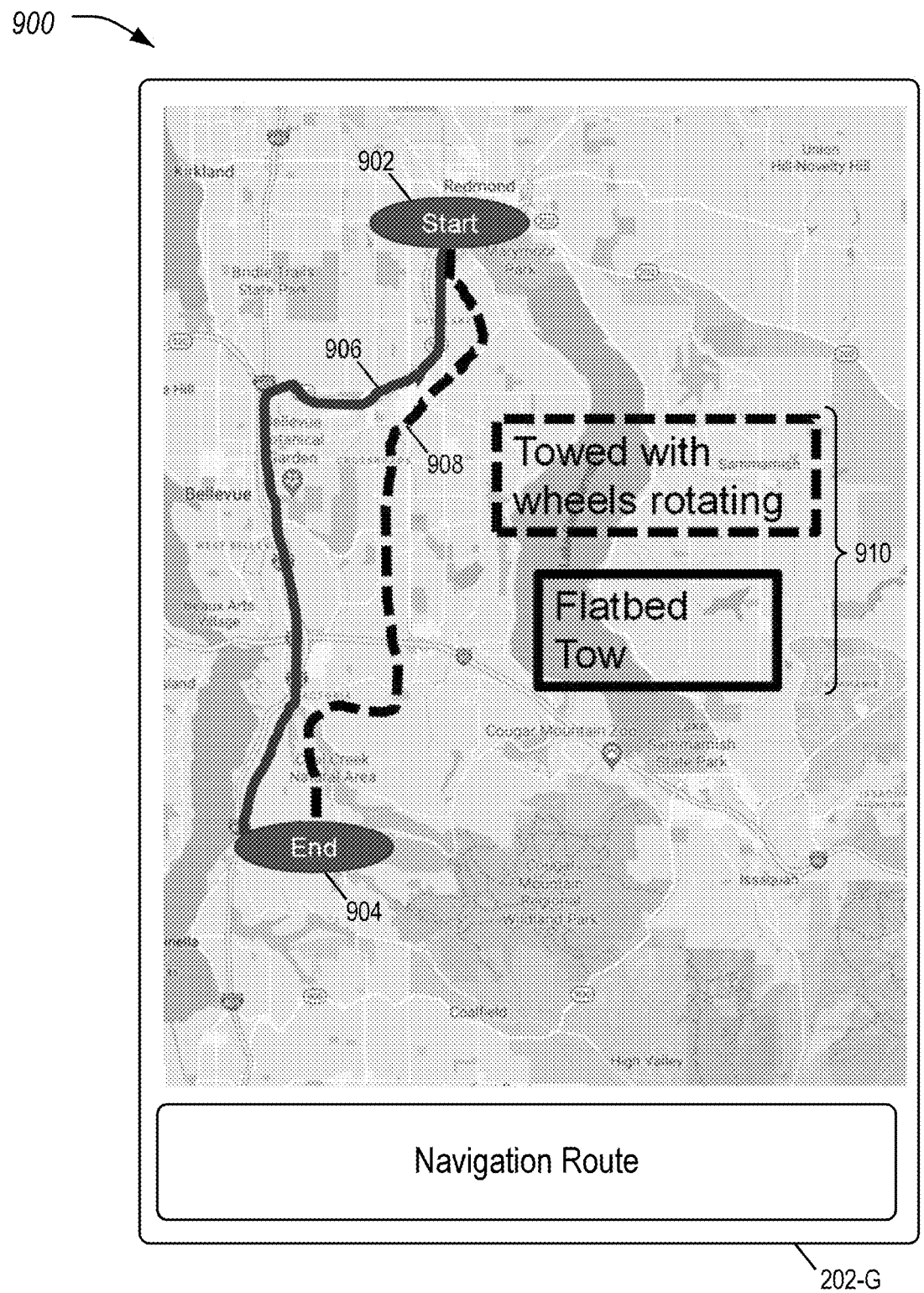
FIG. 9 illustrates an example user interface showing a routing of the towing vehicle from a start location to an end location for different towing methods.

FIG. 9 illustrates an example user interface 900 showing a routing of the towing vehicle 102 from a start location 902 to an end location 904 for different towing methods. As shown, a first route 906 is displayed for a towing configuration in which the towed vehicle 104 is placed on a flatbed. Also shown, a second route 908 is displayed for a towing configuration in which the towed vehicle 104 is towed with its wheels rotating. These routes 906, 908 may be determined based on towing criteria included in the towing information 108. For instance, the towing information 108 may specify first towing criteria (e.g., a first maximum speed and a first maximum distance) for a first tow method (e.g., flatbed), second towing criteria (e.g., a second maximum speed and a second maximum distance) for a second tow method (e.g., dolly 502), and third towing criteria (e.g., a third maximum speed and a third maximum distance) for a third tow method (e.g., vehicle wheels rotating). It should be noted that this is merely an example, and different towing criteria and tow methods may be specified by the towing information 108. Such routing may allow the tow operator to decide which tow method makes the more sense for the current circumstances.

Figure 10:
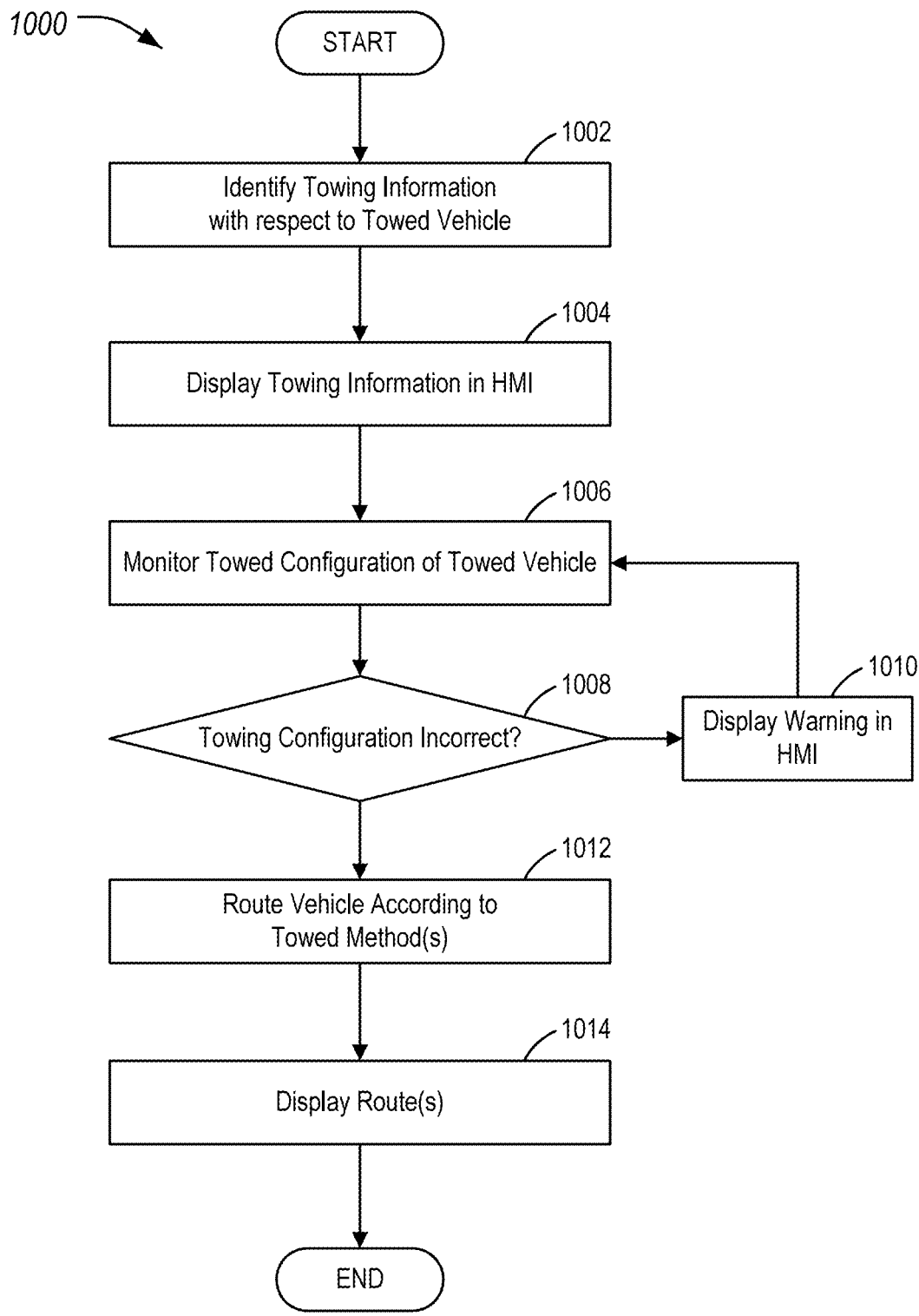
FIG. 10 illustrates an example process for utilizing towing information for informing a towing vehicle that is towing a towed vehicle.

FIG. 10 illustrates an example process 1000 for utilizing towing information 108 for informing a towing vehicle 102 that is towing a towed vehicle 104. In an example, the process 1000 may be performed by the towing vehicle 102 and towed vehicle 104 shown in the system 100.

At operation 1002, the towing vehicle 102 identifies towing information 108 with respect to the towed vehicle 104. In an example, the towing vehicle 102 may receive the towing information 108 from the towed vehicle 104 via communication 106 from the towed vehicle 104 to the towing vehicle 102. The communication 106 may be performed over various protocols, such as DSRC, BLUETOOTH, Wi-Fi, auditory communication, light communication, etc., as noted above. The towing information 108 provides information with respect to how the towing vehicle 102 should tow the towed vehicle 104. For example, towing information 108 may specify towing criteria descriptive of appropriate settings for towing the towed vehicle 104 for one or more tow methods. In another example, the towing vehicle 102 may query a roadside unit for information regarding the towed vehicle 104, e.g., according to VIN.

At operation 1004, the towing vehicle 102 displays the towing information 108 in the HMI 202-G. Example displays of the towing information are discussed above with respect to FIGS. 3-7.

At operation 1006, the towing vehicle 102 monitors the towed configuration of the towed vehicle 104. In an example, the towing vehicle 102 may utilize cameras or other external hardware on the towing vehicle 102, towed vehicle 104, or a mobile device of the user of the towing vehicle 102 to check the orientation of the towed vehicle 104 to ensure it matches a vehicle orientation specified by the towing information 108 as applicable for the towed vehicle 104 before the towing vehicle 102 may enter motive mode to tow the towed vehicle 104. For instance, the towing application 216 may use a back-up camera and/or ultrasonic sensors of the towing vehicle 102 to determine if there is a towed vehicle 104 behind the towing vehicle 102, whether a grill or rear bumper of the towed vehicle 104 is closest to the towing vehicle 102, etc. In another example, the towing vehicle 102 may receive information from the sensors of the towed vehicle 104 via the communication 106 to determine towed vehicle 104 orientation, towed vehicle 104 angle, etc. It should be noted that the monitoring of the towed vehicle 104 may be performed before towing, at the outset of towing, and/or during the towing in case the orientation of the towed vehicle 104 changes during the driving event and should be addressed or changed.

At operation 1008, the towing vehicle 102 determines whether the towing configuration is incorrect. In an example, the towing vehicle 102 compares the towing configuration as monitored at operation 1006 with the towing information 108 as received at operation 1002 to identify whether the towing configuration is a match. For instance, the towing information 108 may specify towing criteria descriptive of appropriate settings for towing the towed vehicle 104 for one or more tow methods, and the towing vehicle 102 may validate to ensure that the towing configuration matches one of the specified tow methods.

At operation 1010, the towing vehicle 102 displays a warning message 802 in the HMI 202-G. If the tow orientation is incorrect, the towing application 216 may provide instructions regarding what is incorrect and/or how to correct the incorrect tow orientation. For instance, as shown in FIG. 8, the warning message 802 may indicate that the towing configuration of the towed vehicle 104 is incorrect, along with a suggestion how to correct the towing configuration.

At operation 1012, the towing vehicle 102 routes the towing vehicle 102 according to the towing methods specified by the towing information 108. This may include, for example, avoiding routes in excess of a maximum towing distance, and/or avoiding roadways with a minimum speed in excess of a maximum towing speed. In some instances, the towing vehicle 102 may only display the route for the current towing configuration of the towed vehicle 104, while in other examples, the towing vehicle 102 may display the route for each of the tow methods.

At operation 1014, the towing vehicle 102 displays the route or routes in the HMI 202-G. In an example, as shown in FIG. 9, the towing vehicle 102 may route the vehicle 102 in accordance with each of the tow methods specified by the towing information 108. The current location of the towing vehicle 102 along the route shown in the HMI 202-G may update as the towing vehicle 102 tows the towed vehicle 104 towards its destination. After operation 1014, the process 1000 ends.

Computing devices described herein, such as the controllers 202 and TCU 208 generally include computer-executable instructions where the instructions may be executable by one or more computing devices such as those listed above. Computer-executable instructions, such as those of the towing application 216, may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A towing vehicle for informed towing, comprising
a transceiver;
a human-machine interface (HMI);
exterior hardware including one or more of a back-up camera or an ultrasonic sensor; and
a processor programmed to
identify towing information with respect to a towed vehicle to be towed by the towing vehicle,
monitor a towed configuration of the towed vehicle using the exterior hardware, and
responsive to the towed configuration of the towed vehicle being incorrect according to the towing information, display a warning in the HMI indicating the incorrect towing configuration and prevent the towing vehicle from entering motive mode.

2. The towing vehicle of claim 1, wherein the processor is further programmed to display a correct towed configuration for the towed vehicle in the HMI.

3. The towing vehicle of claim 1, wherein the processor is further programmed to receive the towing information from the towed vehicle via wireless communication between the towed vehicle and the transceiver of the towing vehicle.

4. The towing vehicle of claim 3, wherein the towing information specifies a correct vehicle orientation of the towed vehicle, and the incorrect towing configuration is that the monitored vehicle orientation does not match the correct vehicle orientation.

5. The towing vehicle of claim 4, wherein the correct vehicle orientation is one of the towed vehicle being oriented facing forwards with respect to the travel direction of the towing vehicle or the towed vehicle being oriented facing backwards with respect to the travel direction of the towing vehicle.

6. The towing vehicle of claim 1, wherein the processor is further programmed to:
receive an identifier of the towed vehicle from the towed vehicle via wireless communication between the towed vehicle and the transceiver of the towing vehicle, and
query for the towing information based on the identifier.

7. The towing vehicle of claim 1, wherein the processor is further programmed to determine a route for the towing vehicle in accordance with top speed and maximum distance settings specified by the towing information as corresponding to the towed configuration.

8. The towing vehicle of claim 7, wherein the processor is further programmed to display the route to the HMI.

9. The towing vehicle of claim 1, wherein the processor is further programmed to prevent the towing vehicle from entering motive mode responsive to the towed configuration of the towed vehicle being incorrect.

10. The towing vehicle of claim 1, wherein the processor is further programmed to display the towing information with respect to how the towing vehicle should tow the towed vehicle to the HMI, the displayed towing information including towing criteria descriptive of appropriate settings for towing the towed vehicle for one or more tow methods, the towing criteria including one or more of: top speed for towing the towed vehicle, maximum distance to tow the towed vehicle, maximum angle to attach the towed vehicle to the towing vehicle, allowable driving maneuvers when towing the towed vehicle, or maximum amount of time to tow the towed vehicle between key on cycles of the towed vehicle.

11. The towing vehicle of claim 1, wherein the processor is further programmed to:
  determine a first route for the towing vehicle in accordance with top speed and maximum distance settings specified by first towing criteria in the towing information corresponding to a first towing method;
  determine a second route for the towing vehicle in accordance with top speed and maximum distance settings specified by second towing criteria in the towing information corresponding to a second towing method; and
  display the first and second routes on the HMI.

12. The towing vehicle of claim 11, wherein the processor is further programmed to label the first route according to the first towing method and label the second route according to the second towing method.

13. A method for informed towing, comprising:
  identifying, by a processor of a towing vehicle, towing information with respect to a towed vehicle to be towed by the towing vehicle;
  monitoring a towed configuration of the towed vehicle by the processor, using exterior hardware of the towing vehicle, the exterior hardware including one or more of a back-up camera or an ultrasonic sensor; and
  responsive to the towed configuration of the towed vehicle being incorrect according to the towing information, using the processor for displaying a warning in an HMI indicating the incorrect towing configuration and preventing the towing vehicle from entering motive mode.

14. The method of claim 13, further comprising displaying a correct towed configuration for the towed vehicle in the HMI.

15. The method of claim 13, further comprising receiving the towing information from the towed vehicle via wireless communication between the towed vehicle and the towing vehicle.

16. The method of claim 13, further comprising:
  receiving an identifier of the towed vehicle from the towed vehicle via wireless communication between the towed vehicle and the towing vehicle; and
  querying for the towing information based on the identifier.

17. The method of claim 13, further comprising:
  determining a route for the towing vehicle in accordance with top speed and maximum distance settings specified by the towing information as corresponding to the towed configuration; and
  displaying the route to the HMI.

18. The method of claim 13, further comprising preventing the towing vehicle from entering motive mode responsive to the towed configuration of the towed vehicle being incorrect.

19. A non-transitory computer-readable medium comprising instructions that, when executed by a processor of a towing vehicle, cause the towing vehicle to perform operations including to:
  identify, by a towing vehicle, towing information with respect to a towed vehicle to be towed by the towing vehicle;
  monitor a towed configuration of the towed vehicle using exterior hardware of the towing vehicle, the exterior hardware including one or more of a back-up camera or an ultrasonic sensor; and
  responsive to the towed configuration of the towed vehicle being incorrect according to the towing information, display a warning in an HMI indicating the incorrect towing configuration and prevent the towing vehicle from entering motive mode.

20. The medium of claim 19, further comprising instructions that, when executed by the processor, cause the towing vehicle to perform operations including to display a correct towed configuration for the towed vehicle in the HMI.

21. The medium of claim 19, further comprising instructions that, when executed by the processor, cause the towing vehicle to perform operations including to receive the towing information from the towed vehicle via wireless communication between the towed vehicle and the towing vehicle.

22. The medium of claim 19, further comprising instructions that, when executed by the processor, cause the towing vehicle to perform operations including to:
  receive an identifier of the towed vehicle from the towed vehicle via wireless communication between the towed vehicle and the towing vehicle; and
  query for the towing information based on the identifier.

23. The medium of claim 19, further comprising instructions that, when executed by the processor, cause the towing vehicle to perform operations including to:
  determine a route for the towing vehicle in accordance with top speed and maximum distance settings specified by the towing information as corresponding to the towed configuration; and
  display the route to the HMI.

* * * * *